US008843838B2

(12) United States Patent  
Hackborn et al.

(10) Patent No.: US 8,843,838 B2  
(45) Date of Patent: Sep. 23, 2014

(54) LIVE WALLPAPER

(75) Inventors: Dianne K. Hackborn, Santa Clara, CA (US); Michael A. Cleron, Menlo Park, CA (US); Romain P. Guy, San Francisco, CA (US); Joseph M. Onorato, Cambridge, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/946,736

(22) Filed: Nov. 15, 2010

(65) Prior Publication Data  
US 2011/0119610 A1 May 19, 2011

Related U.S. Application Data

(60) Provisional application No. 61/261,303, filed on Nov. 13, 2009.

(51) Int. Cl.  
G06F 3/048 (2013.01)

(52) U.S. Cl.  
USPC .......................................... 715/764; 715/866

(58) Field of Classification Search  
None  
See application file for complete search history.

(56) References Cited

U.S. PATENT DOCUMENTS

| | | | | |
|---|---|---|---|---|
| 6,278,448 | B1 * | 8/2001 | Brown et al. | 715/866 |
| 6,819,345 | B1 * | 11/2004 | Jones et al. | 715/856 |
| 7,460,021 | B1 | 12/2008 | Bacon | |
| 8,576,181 | B2 * | 11/2013 | Cho | 345/173 |
| 2004/0148635 | A1 * | 7/2004 | Merchant | 725/109 |
| 2006/0015818 | A1 | 1/2006 | Chaudhri et al. | |
| 2007/0101297 | A1 * | 5/2007 | Forstall et al. | 715/841 |
| 2007/0195105 | A1 | 8/2007 | Koberg | |
| 2009/0122018 | A1 * | 5/2009 | Vymenets et al. | 345/173 |
| 2010/0192224 | A1 * | 7/2010 | Ferri et al. | 726/23 |

OTHER PUBLICATIONS

Chinnathambi, Kirupa. Grassy Field: Concept Study, Aug. 31, 2008, http://web.archive.org/web/20080831223057/http://www.kirupa.com/developer/mx/grass.htm.*

Mirosoft Support, How to Configure the Active Desktop, Jan. 20, 2007, http://support.microsoft.com/kb/171437.* ilike2Flash, Follow object with mouse in Actionscript 3, Aug. 9, 2009, http://www.ilike2flash.com/2009/08/follow-object-with-mouse-in.html.*

Smith, Russ, "Omega One's Journal Bar" Review, Retrieved from the Internet <URL: http://pocketnow.com/review/omega-ones-journal-bar, Oct. 24, 2003,7 pages.

Litchfield, Steve, "Getting more from your E61 Active Standby screen" All About Symbian Feature, Retrieved from the Internet <URL: http://www.allaboutsymbian.com/features/item/Getting_more_from_your_E61_Active_Stan. . . Jul. 7, 2010, Jun. 22, 2006, 6 pages.

(Continued)

Primary Examiner — Matt Kim  
Assistant Examiner — William Trapanese  
(74) Attorney, Agent, or Firm — Fish & Richardson P.C.

(57) ABSTRACT

Display of on-screen elements is coordinated, which includes generating a graphical wallpaper representation in a first process on a first visual layer on a display of a computing device, generating one or more graphical objects in a second process on a second visual layer of the display, wherein the second visual layer is positioned visually on top of the first visual layer, receiving user interactions with the one or more graphical objects and generating information that reflects the user interactions, and communicating the generated information to the first process.

33 Claims, 11 Drawing Sheets

(56) References Cited

OTHER PUBLICATIONS

"Using a simple and useful template for creating Flash Lite wallpaper" Adobe Developer Retrieved from the Internet <URL: http://www.adobe.com/devnet/devices/articles/flashlite_wallpaper_templates.html, 9 pages.

Dolcourt, Jessica, "Make Google Maps your live Android wallpaper" Android Atlas—CNET Blogs Retrieved from the Internet <URL: http://www.cnet.com/8301-19736_1-20000742-251.html, Mar. 18, 2010, 2 pages.

Guy, Roman. "Live Wallpapers." Android Developers Blog: Live wallpapers, Feb. 5, 2010. Retrieved from the Internet <URL: http://android-developers.blogspot.com/2010/02/live-wallpapers.html, 1 page.

Authorized Officer Karine Lambert, International Search Report and Written Opinion for Application No. PCT/US2010056745, dated Mar. 22, 2011, 10 pages.

Nickitas-Etienne, Athina, Authorized Officer, International Bureau of WIPO, International Preliminary Report on Patentability, International Application No. PCT/US2010/056745, mailed May 24, 2012, 9 pages.

European Office Action in European Application No. 10 782 756.0, dated Apr. 9, 2013, 5 pages.

Australian Office Action in Australian Application No. 2010320034, dated Dec. 5, 2013, 3 pages.

* cited by examiner

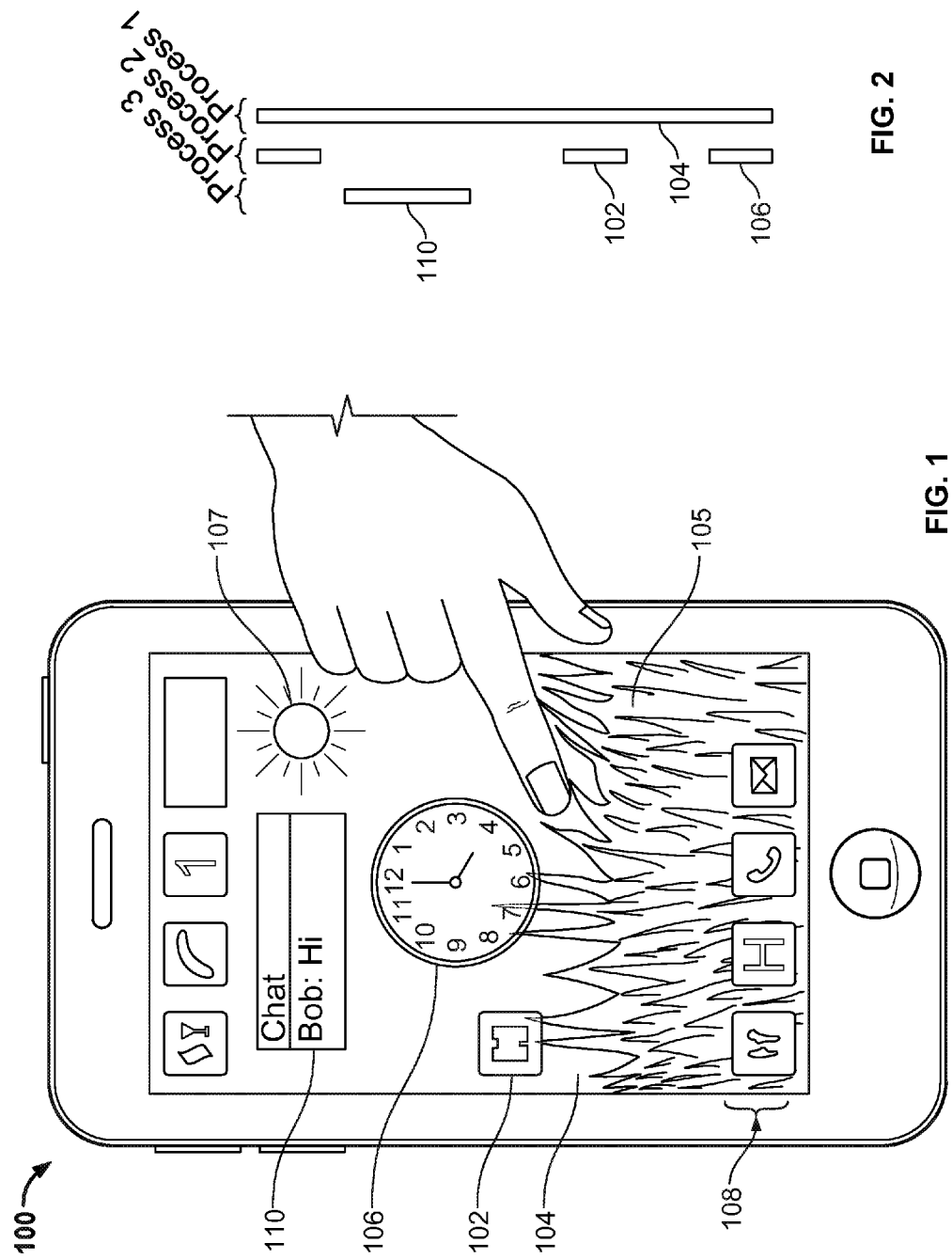

LIVE WALLPAPER

CROSS-REFERENCE TO RELATED APPLICATIONS

This application claims the benefit under 35 U.S.C. §119 (e) of U.S. Provisional Patent Application No. 61/261,303, titled "Live Wallpaper," filed on Nov. 13, 2009, and which is incorporated herein by reference.

TECHNICAL FIELD

This document relates to components of computer operating systems, including background desktop components commonly referred to as computer wallpaper.

BACKGROUND

Computer operating systems perform a number of functions, including serving as a bridge between computer hardware and computer applications that run on the operating systems. Modern computer operating systems also provide basic graphical user interfaces (GUIs) by which users can interact with components of the operating system in more intuitive manners. For example, an operating system may define basic graphical building blocks that applications can access so that they can generate advanced and consistent user interfaces relatively easily.

One example of a GUI generated by an operating system is a typical desktop or home screen for an operating system. The home screen is an area of the operating system where various selectable controls, such as in the form of icons, can be positioned, displayed, and selected, so that a user may launch or be directed to one or more applications associated with the icons. Items such as gadgets or widgets may also be displayed over a home screen. In addition, when applications are launched, they may be displayed in a window or similar structure over a home screen.

The various objects that are part of a home screen may be segregated into various display layers, with some layers appearing in front of other layers. For example, when a user launches an application, the window for the application may become active, and move visually in front of other objects that were previously displayed on a home screen. Also, a home page generally has a back-most layer that fills substantially all of the display and acts as a background, or as wallpaper when the background is formed from a graphical image. Icons that can be selected by a user to launch or maximize applications may be displayed on a visual layer in front of the background but behind any open applications.

SUMMARY

This document describes systems and techniques that may be used for managing objects on a home screen for a computer operating system.

In a first general aspect, a computer-implemented method for coordinating a display of on-screen elements on a computing device includes generating a graphical wallpaper representation in a first process on a first visual layer on a display of a computing device. The method also includes generating one or more graphical objects in a second process on a second visual layer of the display, wherein the second visual layer is positioned visually on top of the first visual layer. The method further includes receiving user interactions with the one or more graphical objects and generating information that reflects the user interactions, and communicating the generated information to the first process.

In various implementations, generating the graphical wallpaper representation may include displaying a visual image that covers substantially an entirety of a display on the computing device. The method may also include changing a manner in which the graphical wallpaper representation is displayed using the generated information. The user interactions may include dragging across the display, and changing the manner in which the graphical wallpaper representation is displayed may include animating motion in the graphical wallpaper representation in a manner that simulates frictional dragging of elements of the graphical wallpaper representation. The animating motion may include bending one or more graphical elements in a direction of the dragging input. The user interactions may include moving and dropping an icon on a home screen, and changing the manner in which the graphical wallpaper representation is displayed may include animating a perturbation in a surface of the graphical wallpaper representation. Animating the perturbation may include animating motion that radiates out, on the graphical wallpaper representation, from a location at which the icon was dropped. At least one of the one or more graphical objects may be at least partially transparent so as to permit part of the graphical wallpaper representation to show through on the display within an area defined by an outer perimeter of the at least one graphical object. The method may also include displaying in the graphical wallpaper representation, a live image being captured in real-time by a digital camera in the computing device, or an image representing real-time data downloaded from a remote web server over a wireless connection to the computing device. The image representing real-time data downloaded from the remote web server may include information from a social networking site, a map, or weather information. The method may also include receiving a user selection of an object on the second layer and opening a graphical object in a third layer that is visually in front of the second layer and that executes in a third process that differs from the first process and the second process.

In a second general aspect, a computer-implemented method for generating a graphical user interface on a display of a computing device includes generating a graphical wallpaper representation in a first process on a first visual layer on a display of a computing device, and generating one or more graphical objects in a second process on a second visual layer of the display, wherein the second visual layer is positioned visually on top of the first visual layer. The method also includes receiving user input on the display, and communicating to the first process data reflecting the user input. The method further includes producing an animated moving display of the graphical wallpaper representation in response to the user input on the display.

In a third general aspect, a tangible machine-readable storage medium, having recorded and stored thereon instructions, that when executed, perform actions that include generating a graphical wallpaper representation in a first process on a first visual layer on a display of a computing device. The actions also include generating one or more graphical objects in a second process on a second visual layer of the display, wherein the second visual layer is positioned visually on top of the first visual layer. The actions further include receiving user interactions with the one or more graphical objects and generating information that reflects the user interactions, and communicating the generated information to the first process.

In a fourth general aspect, a computer-implemented system includes a first object for generating a graphical representation of a background wallpaper for a home screen of a computing device, the first object including executable content that when executed, causes the first object to react to inputs from a user of the device. The system also includes one or more user selectable second objects, and a display controller programmed to generate a graphical display of the first object in a first execution process and on a first visual layer of a display of the computing device, and to generate a graphical display of the one or more user selectable objects in a second execution process that is distinct from the first execution process, and on a second visual layer of the display that is visually in front of the first visual layer of the display.

In a fifth general aspect, a computer-implemented system includes a first object for generating a graphical representation of a background wallpaper for a home screen of a computing device, the first object including executable content that when executed, causes the first object to react to inputs from a user of the device. The system also includes one or more user selectable second objects, and a display controller programmed to generate a graphical display of the first object in a first execution process and on a first visual layer of a display of the computing device, and to generate a graphical display of the one or more user selectable objects in a second execution process that is distinct from the first execution process, and on a second visual layer of the display that is visually in front of the first visual layer of the display.

In a sixth general aspect, a computer-implemented method for coordinating a display of on-screen elements on a computing device includes generating a graphical wallpaper representation in a first environment on a first visual layer on a display of a computing device, and generating one or more graphical objects in a second environment on a second visual layer of the display, wherein the second visual layer is positioned visually on top of the first visual layer. The method also includes receiving information from another computing device and communicating the received information to the first environment, and changing a displayed appearance of the graphical wallpaper representation in the first environment on the first visual layer using the received information.

The details of one or more implementations are set forth in the accompanying drawings and the description below. Other features and advantages will be apparent from the description and drawings, and from the claims.

BRIEF DESCRIPTION OF THE DRAWINGS

FIG. 1 shows a computing device displaying a home screen layout that includes live wallpaper.

FIG. 2 shows a conceptual side diagram of the display shown on the device of FIG. 1.

DETAILED DESCRIPTION

Figure 3A:
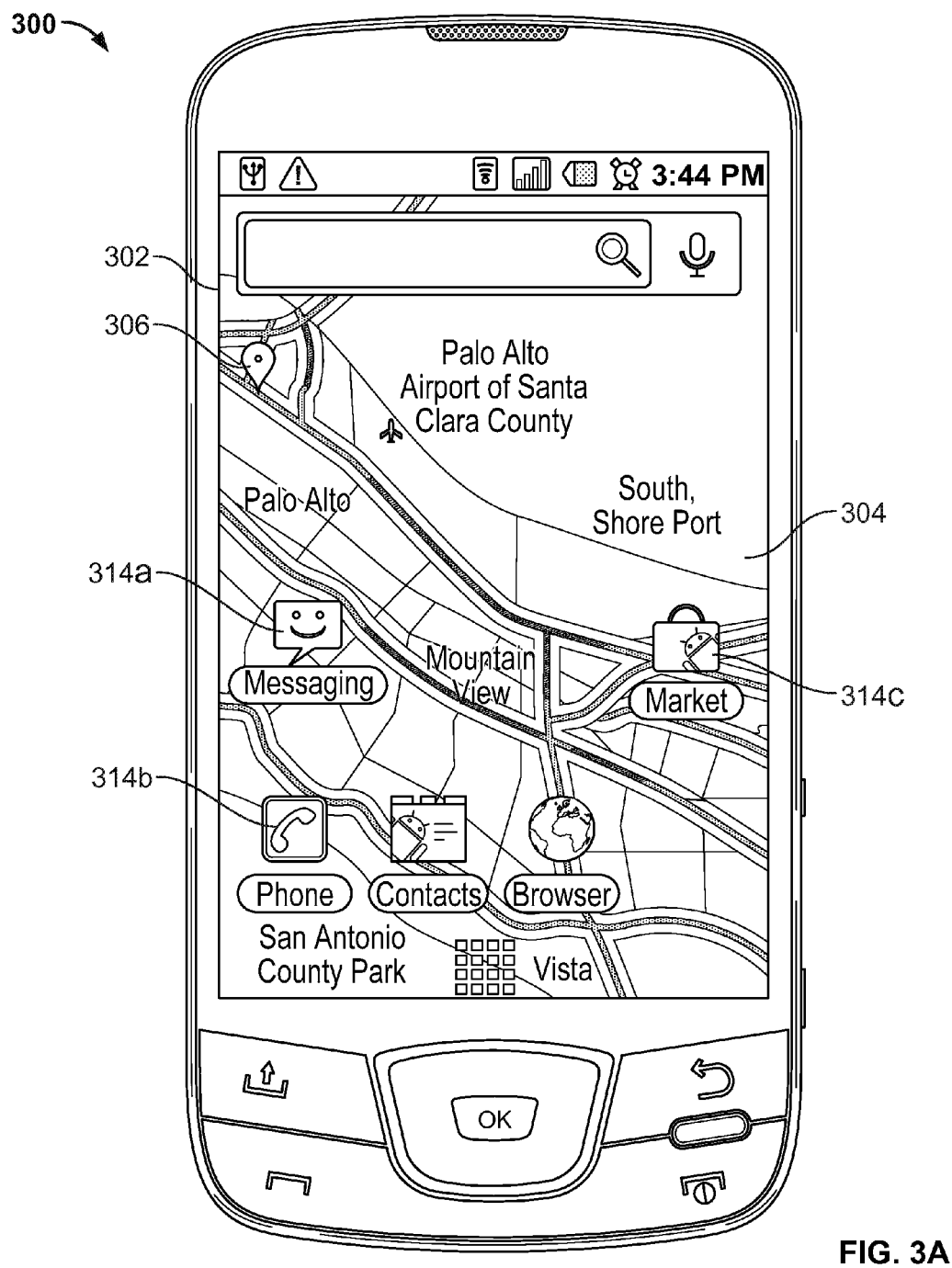
FIGS. 3A and 3B show examples of active content that includes a map being produced as live wallpaper.

This document describes mechanisms by which an operating system may manage interactions with graphical objects that can be viewed by and/or manipulated by a user of a computing device. The graphical objects in the example implementations are objects that are displayed as part of a home screen for an operating device—the screen that is shown behind applications that may be opened by a user, such as when a user has minimized all such applications. Traditionally, a home screen includes a background, which may extend across substantially all of a display (e.g., except for a task bar or status bar around the display periphery or on a portion of the display periphery) and may be a plain color, or may include an image in the form of wallpaper, to better beautify the home screen. Users may traditionally be allowed to select particular images for their wallpaper so as to better customize their computing devices to their tastes. Icons may be shown on a visual layer in front of the background/wallpaper, meaning that the icons can be moved independently of the wallpaper, and are displayed by the device visually on top of the wallpaper, so that when there is an overlap, the icons are shown and the wallpaper is obscured. In addition, open applications may be shown in a visual layer that is even farther in front of the layer for the icons, so that when an application is maximized, none of the other two layers is shown.

A general home screen layout is shown in FIG. 1, where a computing device 100 (e.g., a smart phone, tablet device, laptop device, pad device, personal digital assistant, electronic reading device, or the like) with a display screen presents a display, but in this example, the wallpaper 104 is live. An example of such a state of the wallpaper is shown in the figure by the wallpaper's 104 reaction to a user input on a screen of the device 100. In particular, in this example, the wallpaper shows grass 105 below a sunny sky 107, and may ordinarily look like a traditional wallpaper in the form of a static image. However, the wallpaper 104 in this example may instead be an object that includes executable code so that the wallpaper may be active, and in this example may respond to inputs from a user of the computing device or otherwise change in response to received information from the user or from another computing device. The executable code of the object may cause the wallpaper 104 to change in appearance, perhaps at the direction of a display controller, following receipt of information, and such change in appearance may provide updated information, altered aesthetics, a change of theme, environment or pace, or a diversion from the status quo.

The device 100 may include, for example, a module or machine (e.g., a virtual machine) that isolates various software components or pieces of code so that the wallpaper object may execute independently of various applications or other constructs that may execute on the device 100. In this way, the wallpaper object may execute in its own separate environment, and the wallpaper 104 may be updated independently of other displayed graphics that are associated with the other objects, constructs, or applications. The other objects, constructs, or applications may include code executing independently or in a separate environment from the wallpaper object, and the code associated with these other objects, constructs, or applications may cause graphical objects to be displayed on the device, where these objects are displayed on top of or in front of, and separate from, the wallpaper 104.

In the example shown in FIG. 1, a user is swiping her finger across a touch-sensitive display screen of the computing device. In response, the blades of grass 105 displayed in the area of the screen swiped by the user are caused to bend or sway as if contacted by the user's finger during the swipe. Other examples of live wallpaper may not be immediately responsive to user input on the screen of the device. Rather, some examples of live wallpaper may be displayed and updated so that an appearance of the wallpaper is changed, but may become responsive to direct user input only after a predetermined user input is received by the device. Examples of predetermined user inputs that may be received by the device to cause the live wallpaper to become responsive to user input can include agitating or shaking the device, selecting an icon, button (not shown in FIG. 1), or area of the display screen (e.g., a corner of the screen) reserved for activating the live wallpaper, making a particular movement on or across the display screen, tapping on the display screen a predetermined number of times within a predetermined time period, and others. Thus, in a first mode, user input on a touchscreen may be interpreted as being directed to icons displayed on a layer over the wallpaper, and in another mode (which can be switched to using the techniques just described), user input may be interpreted as being directed to items displayed on the wallpaper. When such mode switching occurs, the appearance of the wallpaper and the icons or other overlying objects may change, such as by changing the icons to a transparent or shadowed appearance.

FIG. 2 shows a conceptual side diagram of the display shown on device 100 of FIG. 1. FIG. 2 shows two particularly relevant points about the display shown on device 100. First, the wallpaper 104, icons or gadgets such as icon 102 and gadget 106, and applications such as open and executing chat application 110, are on different visual layers of the display shown on device 100. This does not mean that the objects are physically arranged as they are shown in FIG. 2. Rather, it refers to their relative priority for display with a display manager or display controller on the device. In particular, when an element of the wallpaper 104 overlaps in the x-y dimension (that is, in the plane of the display) with an icon 102 or gadget 106, the icon or gadget will receive priority for display so that it looks to the user like it is positioned closer to the user than is the wallpaper.

The four icons 108 shown near the bottom of the display in FIG. 1 illustrate this point, as the icons 108 appear on top of, or over, the grass 105 of the wallpaper 104. In the case of each of the four icons 108, the icons completely hide or obscure the portion of the wallpaper that is below or under the icons 108, as displayed. Icon 102, by contrast, is partially transparent, or shadowed, so that while icon 102 still appears on top of, or over, the grass 105 of the wallpaper 104, the portion of the grass 105 behind icon 102 is still displayed, albeit less prominently than the grass 105 that is not behind the icon 102. Gadget 106, a clock in this example, is similarly displayed in a partially transparent manner. In general, a user may be able to select whether all, some, or particular icons are displayed in a partially transparent manner or in a manner that completely obscures the portion of the wallpaper below the icon.

Second, referring again to FIG. 2, each of the particular visual layers of objects runs in its own executing process or environment in an operating system that is separate and distinct from the processes or environments in which objects for the other layers run. FIG. 2 labels each of the layers, respectively, as "Process 1," "Process 2," and "Process 3," and the term "process" is intended by its ordinary usage to represent an environment, isolated from other such environments, in which one or more pieces of code may execute in such isolation. The process or environment corresponds to the particular graphical "plane," "surface," or "layer" of the display such that the pieces of code are associated with, and that plane, surface, or layer of the display may be updated by the executing code or a display controller as the respective code segments execute. FIG. 2 represents that the wallpaper 104 runs in a first environment that corresponds to a plane, surface, or layer of the display at a first or lowest level of the display, and is shown furthest right in FIG. 2. Thus, the wallpaper 404 tends to appear to the user as though it were behind all icons, gadgets, images or other items that appear on the screen. Icon 102 and gadget 106 are shown running in a second environment that corresponds to a plane, surface, or layer of the display at a second or middle level of the display, and is shown left of the first environment in FIG. 2. Application 110 is shown running in a third environment that corresponds to a plane, surface, or layer of the display at a third or top level of the display, and is shown furthest left in FIG. 2. This example shows three environments or processes, but in other examples there could be two, four, five, or more environments or processes.

As described above, code executing in a particular environment may be isolated from code executing in other environments. In particular, the individual processes (environments) may be fully sandboxed one from the next, for example. Also, each layer representing a process may also have objects running in different distinct and sandboxed processes. In this manner, one process can hang up or fail without affecting the other processes. For example, the wallpaper 104 may freeze, and the process may be restarted so that new wallpaper 104 may be generated, without affecting the chat application 110, which is executing in a different process. In some implementations, a virtual machine ("VM") may be used to separate and isolate various software components (e.g., pieces of code). For example, the VM may manage the three processes shown in FIG. 2.

The processes for different visual layers may also communicate with each other, in some implementations. In this example, a process for the home page itself is communicating with a process for the wallpaper 104. In particular, the user input of dragging a finger across the top of the grass may not be received and processed by the wallpaper 104 process. Rather, the input may be received by a home screen process, which may interpret the input and pass it to the wallpaper 104 process. The message that passes the information may indicate a vector representing the position, direction, and speed of the user's dragging motion. Such information may then be used by the process executing the wallpaper 104 to determine that the user's finger contacted items on the wallpaper—here, the grass 105. Such information may be used to generate an animation that makes the grass blades look as if the finger is actually contacting them as it drags across the screen of the device 100.

Other various effects may also be achieved in a similar manner. For example, if a user presses on an icon 102 or gadget 106, moves it by dragging their finger, and then releases it, the object may send a message to the wallpaper 104 process indicating that it was dropped at a particular location on the screen. The wallpaper object may then be programmed to produce an animation that looks like rippling water emanating away from the icon or gadget where it was dropped by the user.

Alternatively, or in addition, active content may be produced on the wallpaper from sources other than from other objects displayed on the screen 100. For example, a video stream may be received from a digital camera on a device and may be displayed as live wallpaper behind the various icons to provide a sort of "live view" feature on a portable computing device such as a smart phone or app phone. Also, real-time web content may also be displayed as part of the wallpaper on a visual layer behind the visual layer on which icons are displayed (though the icons can be at least partially transparent, such as where an icon does not include relevant content), such as updated sports scores or stock prices.

In this manner, the wallpaper need not be a static image, but can be active and may execute code so as to produce interesting and compelling user interface examples.

Figure 3B:
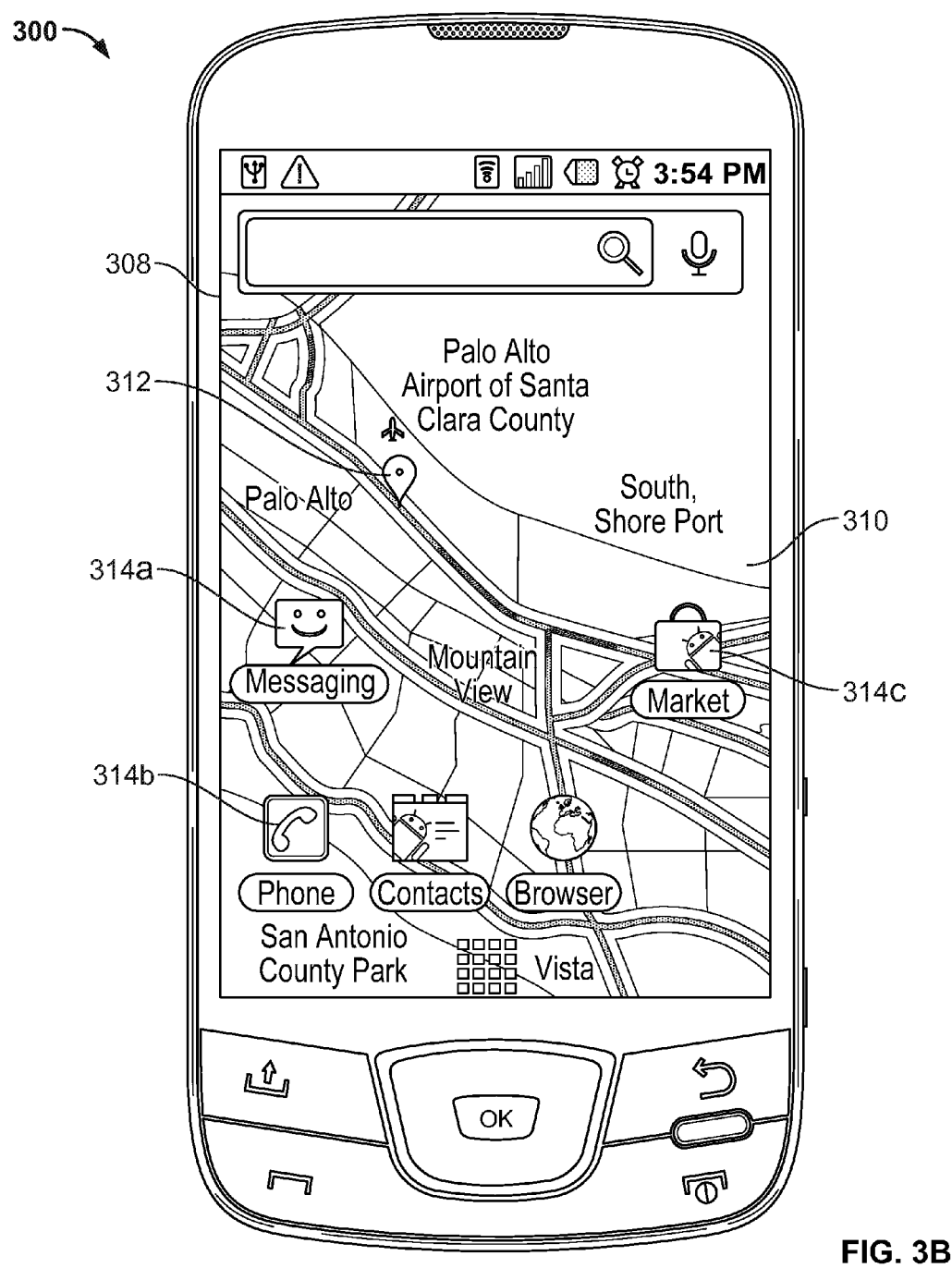

FIG. 3A shows an example of active content being produced as wallpaper 304 for a display 302 of a computing device 300. In this example, the wallpaper 304 is a map that is periodically updated as new information is received from a remote server or from a service provider. The computing device 300, a smart phone in this example, may receive traffic information wirelessly from another computing device, and may use the information to update the map wallpaper 304. The device 300 may also receive GPS information and may use the information to provide an indication 306 of the device's present location on the map wallpaper 304. The device 300 shown in FIG. 3B provides an updated display 308 showing map wallpaper 310 that has been updated to show a new location 312 of the device 300, which may represent progress that the user has made in driving to a destination since the display 302 of FIG. 3A was presented. Each of displays 302 and 308 show icons 314a, 314b, 314c displayed above the map wallpaper 304, 310. Code associated with an object corresponding to the map wallpaper 304, 310 may be executing in a first environment or process, and code associated with the icon objects 314a, 314b, 314c may be executing in a second environment or process, for example.

In some implementations, the map wallpaper 304, 310 can be used to convey traffic information. For example, portions of roads or highways may be shaded or presented in a color that indicates a level of traffic (e.g., light, moderate, heavy). It can be seen in FIGS. 3A and 3B that portions of the roads are shaded relative to other portions in this manner, and that the wallpaper 310 of FIG. 3B has updated traffic information with respect to the wallpaper 304 of FIG. 3A. For simplicity, map wallpapers 304 and 310 each provide a single indication of traffic levels (e.g., generally representing traffic in either direction) at each point along the roads, where areas of heavy traffic are indicated by darker shading. In other examples, separate traffic indications may be presented for each direction of traffic. In various implementations, a user may be permitted to zoom in at a particular location on the map wallpaper 304, 310, to display a more specific view of a smaller geographic area, or may zoom out to display a broader view of a larger geographic area. In some examples, a user may choose between different styles of map wallpaper presentation, such as a satellite style view, a terrain-style view, or a line-map-style view.

In various implementations, a user may select the wallpaper 304 or a portion of the wallpaper to receive more detailed information. Traffic delay times, construction updates, route information, alternative route information, accident information, and the like may be provided in various examples.

Figure 4:
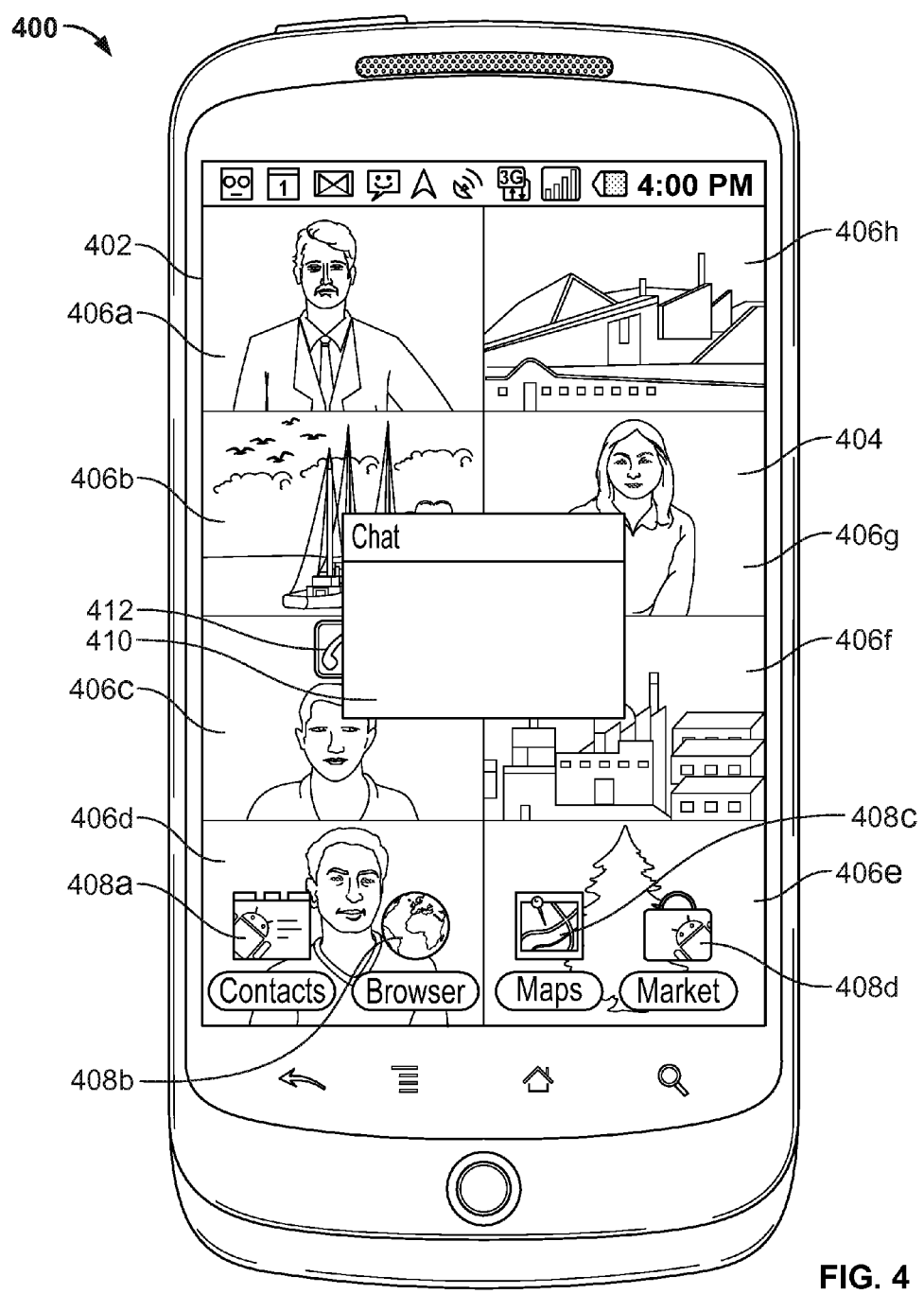
FIG. 4 shows an example of active content that includes information from a social service being produced as live wallpaper.

FIG. 4 shows another example of active content being produced as wallpaper 404 for a display 402 of a computing device 400. The live wallpaper 404 displays images 406a-h fetched or received from one or more social services on the Internet. The images 406a-h may be pictures posted to a social networking site (e.g., Google Buzz, Facebook, MySpace, Flickr, Twitter, and the like) by friends or acquaintances of the user, for example, and the information may be received by the device from a web server associated with the networking site. The images 406a-h may be arranged in any appropriate pattern, and more or fewer images may be displayed at a given time. In various implementations, the device 400 may receive information indicating that one or more new images are available for display on the wallpaper 404, and the new images may be added to the wallpaper or replace one or more images that had been displayed on the wallpaper 404. The images 406a-h can optionally include text or other identifying information (not shown) that may represent, for example, the poster of the picture, the date that the picture was taken or posted, a comment or rating of the picture or image, or other descriptive information. In other examples, video, rather than still images, may be shown as part of the live wallpaper. Video information may be received from a web server associated with a social site such as YouTube, for example.

Icons 408a-d and 412 are shown displayed above the live wallpaper 404. An executing chat application window 410 is shown displayed above the wallpaper 404 and the icon 412. As can be seen, icon 412 is displayed above the wallpaper 404 but below the application window 410, as a portion of the icon 412 is obscured by the application window 410. The user may be chatting with a friend using the application window 412, and the live wallpaper 404 may update as new images are received. Newly received images may be faded in over displayed images to take the place of the previously displayed image, for example, or may be scrolled in or otherwise assume a place in the display montage.

In some implementations, the user may select one of the images, such as image 406g, which may cause an application to launch or bring focus to the application. For example, if image 406g is an image received from the Facebook networking site, selection of the image may launch or activate a Facebook application on the device, and the user may correspond with her friend or acquaintance who posted the image 406g. In other examples, selection of an image displayed in the wallpaper 404 may cause the device 400 to dial a telephone number associated with the image, or to send a text message to a recipient associated with the image.

Figure 5A:
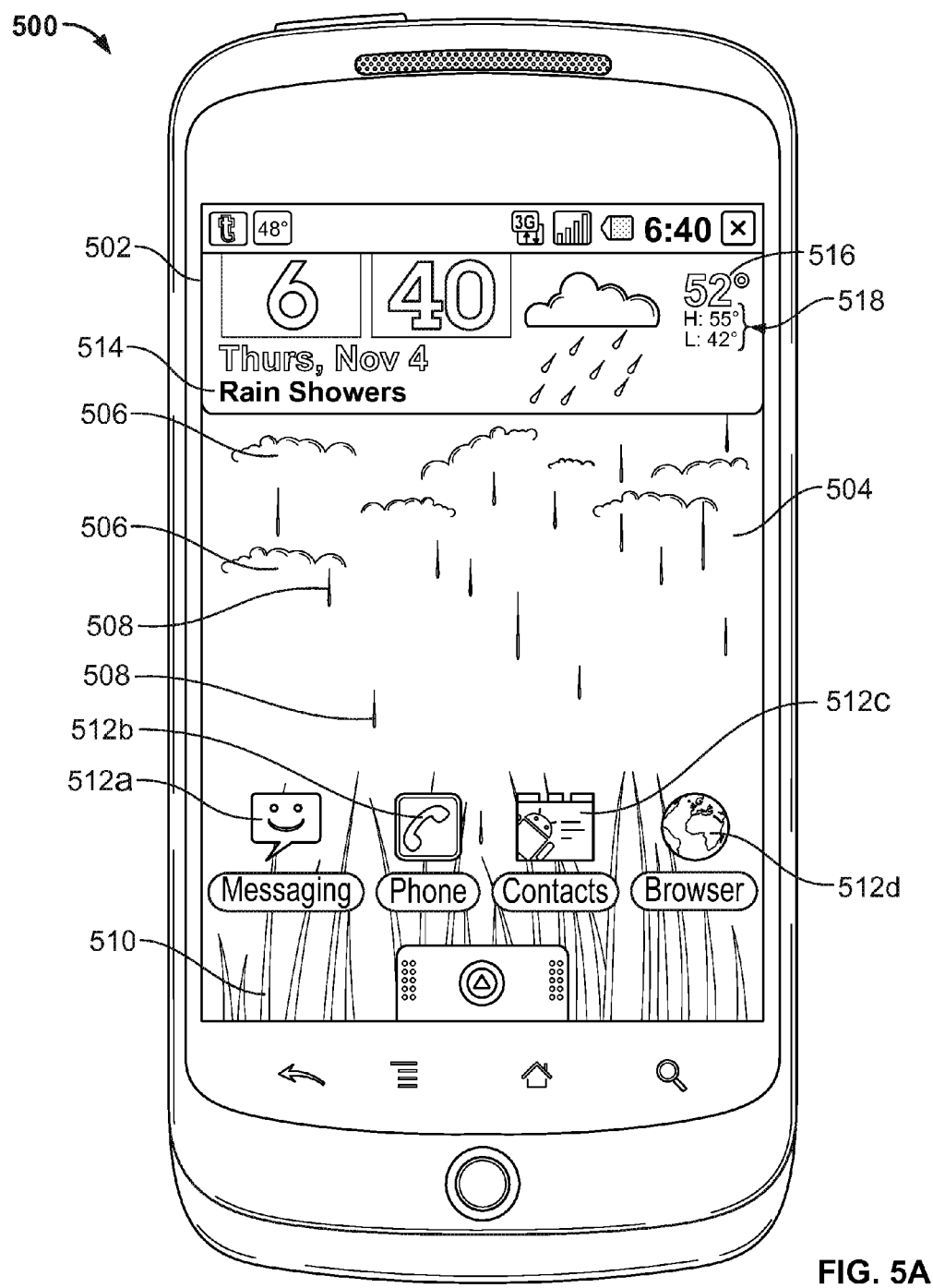
FIGS. 5A and 5B show examples of active content that includes weather information being produced as live wallpaper.
Figure 5B:
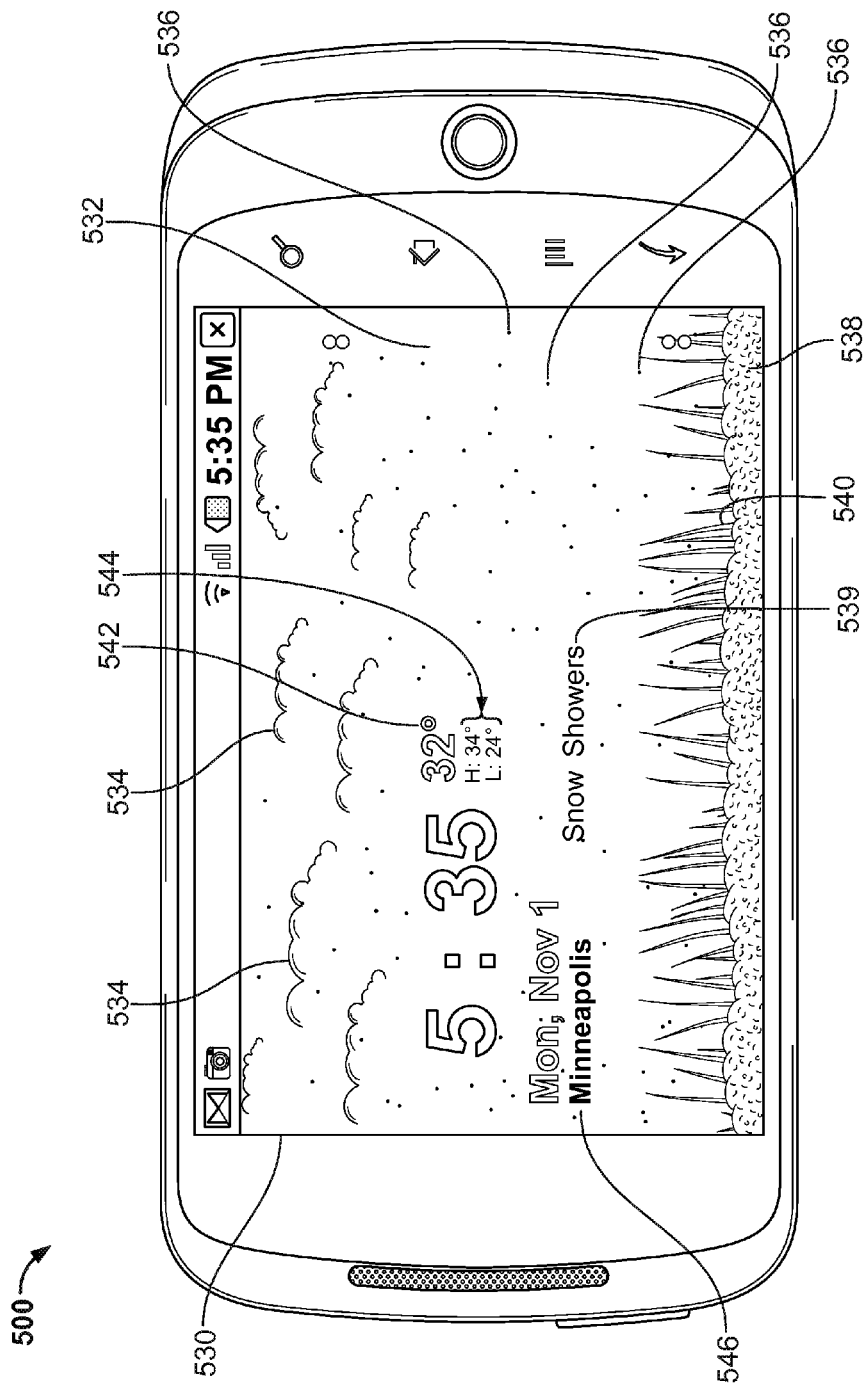

FIGS. 5A and 5B show further examples of active content being produced as live wallpaper on a computing device 500. FIG. 5A shows a display 502 that includes wallpaper 504 showing graphics that indicate current and predicted weather. The wallpaper 504 includes a graphical representation of current weather conditions, which in this example include rain showers illustrated by a cloud with rain near the top of the display. In a main portion of the display, clouds 506 are displayed as part of the wallpaper, and rain drops 508 are shown falling from the clouds. The rain is shown falling onto grass 510 of the wallpaper. In addition to the graphical indication of present weather conditions, in this example a textual description 514 indicates "Rain Showers." A current temperature 516 is shown, along with forecasted high and low temperatures 518 for the day. In some examples, graphics displayed on a portion of the wallpaper may generally indicate the particular season, such as flowers for "spring," grass for "summer," piles of leaves for "autumn," or snow banks for "winter." Icons 512a-d are shown over or above the wallpaper 504 (specifically, on top of the grass 510 of the wallpaper 504 in this example). Were the user to select one of the icons 512, such as "Contacts" icon 512c, an application may be launched or activated and an application window may appear on a plane, surface, or level of the display 502 above the icon 512 level and further above the wallpaper 504 level. Even though the user may be working with applications on the device 500 or otherwise using the device 500, the live wallpaper 504 may update in the background (executing in its own environment) and the displayed appearance of the wallpaper 504 may change as a result.

FIG. 5B shows another example display 530 that includes live wallpaper 532 depicting current weather conditions for a particular area ("Minneapolis" 546 in this example). Clouds 534 are shown as part of the wallpaper and snow 536 is shown falling from the clouds 534. The snow 536 is shown accumulating on the ground into a snow layer 538. Grass 540 is shown poking through the snow layer 538, which may indicate that this is the first snowfall of the year, or that only a small amount of snow is present on the ground in Minneapolis as of Monday, November 1, the displayed date. A textual indication 539 of the weather conditions is displayed ("Snow Showers"), along with a current temperature 542 and forecasted high and low temperatures 544. The weather information may be received from another computing device, for example, and the code associated with the wallpaper object may cause the information to be displayed on the wallpaper. New information may be received periodically or as weather conditions change, for example, and the new information may be presented on the display 530 as part of the live wallpaper 532. Additional information such as wind speed, wind chill, UV index, tide levels, air quality, humidity, barometric pressure, hour-by-hour forecast information, extended (e.g. 10-day) forecasts, and the like may also be provided, and in some cases detailed information may be provided in response to a selection by a user.

In some examples, a user may be able to display a split-screen wallpaper view of weather information for two or more locations. For example, if the user is travelling on a business trip to Dallas, the user may elect to display Dallas weather information on one portion of the screen and weather information for her home on a second portion of the screen. As another example, if the user is planning a vacation to Hawaii next week, she may wish to see weather information for the Aloha state in the days leading up to her departure.

Figure 6:
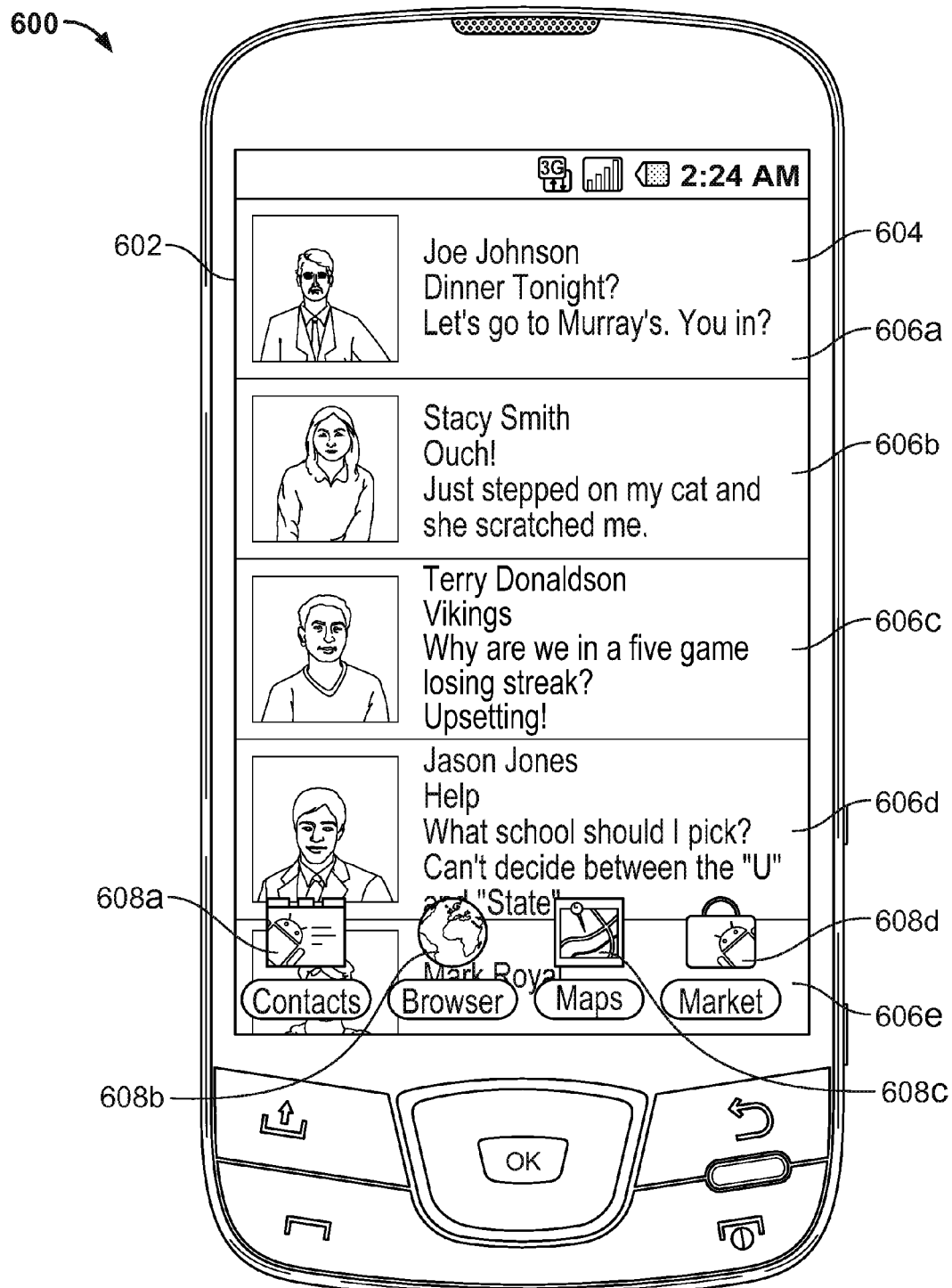
FIG. 6 shows another example of active content that includes information from a social service being produced as live wallpaper.

FIG. 6 shows yet another example of active content being produced as live wallpaper on a computing device 600. A display 602 of the device 600 displays the live wallpaper 604, which includes information fetched or received from one or more social services on the Internet. The information includes posts or tweets 606a-e from a social networking site (e.g., Google Buzz, Facebook, MySpace, Flickr, Twitter, and the like) posted by friends, acquaintances, group members or contacts of the user, for example and the information may be received by the device from a web server associated with the networking site. The depicted posts 606 include an image in this example, but in other examples the posts 606a-e may omit the image. The posts 606a-e include textual information and an indication of the poster's identity.

The posts 606a-e may be displayed in various manners. For example, as new information is received, already displayed posts may be scrolled (e.g., downward) and the new post may be displayed in a predetermined position. For example, post 606a in the present example may be the most recently received message, and may be displayed near the top of the display 602. When post 606a is received, the previously displayed posts (e.g., posts 606b, 606c, 606d, 606e) may be shifted downward. As can be seen, post 606e is only partially displayed near the bottom of the display 602. Icons 608a-d are shown on a display layer above the wallpaper 604. While no application windows are shown in FIG. 6, it is understood that a user could launch an application and work in an application area on the display 602, where the application area would be displayed above the wallpaper layer and the icon layer, for example. In various implementations, there can be multiple application layers. The live wallpaper 604 may continue to update in the background, whether the user is working on applications or not, and may be updated in the background. When wallpaper updates occur and the appearance of the wallpaper 604 is caused to change, the wallpaper may continue to occupy the bottom-most visual display layer or plane of the display 602, for example below the icon or gadget layer and further below one or more application layers, if applicable.

In general and with regard to any of the displayed examples of live wallpaper in the figures, the wallpaper or a portion of the wallpaper be selected, or a particular input may be provided, to cause the wallpaper or portion thereof to assume a more prominent display position or status. For example, display planes may be adjusted based on certain inputs or information received (e.g., from another computing device). In some examples, selection of the wallpaper or a portion of the wallpaper, or provision of a predefined input, may cause an application associated with the wallpaper or a portion of the wallpaper to launch or become active, and may allow the user to work with an aspect of the wallpaper or associated with the displayed wallpaper. For example, the user may view Terry Donaldson's post 606c and select the post to provide an opinion to the question posed. The user may respond that the coaching is subpar and that a change is warranted, as by speaking or typing such a response, and a message may be sent from the device 600 to another computing device (e.g., by wireless transmission). For example, if message 606c represents a Facebook post, selection of message 606c may launch a Facebook application on device 600, which may permit the user to respond to Donaldson's post 606c.

The displayed messages 606a-e displayed in wallpaper 604 could alternatively be emails received in one or more of the user's email accounts. Calendar reminders could alternatively be provided as well. In some implementations, additional information can be shown, such as date and time of message (or image or video) posting.

In various implementations, live wallpaper can include a combination of the described wallpaper examples. For example, images (such as images 406a-h in FIG. 4) and information (such as posts 606a-e in FIG. 6) from social networking sites may be combined for presentation in a live wallpaper display. Similarly, weather information, traffic information, sports scores, stock prices or other information may be shown alongside other live wallpaper content.

Figure 7:
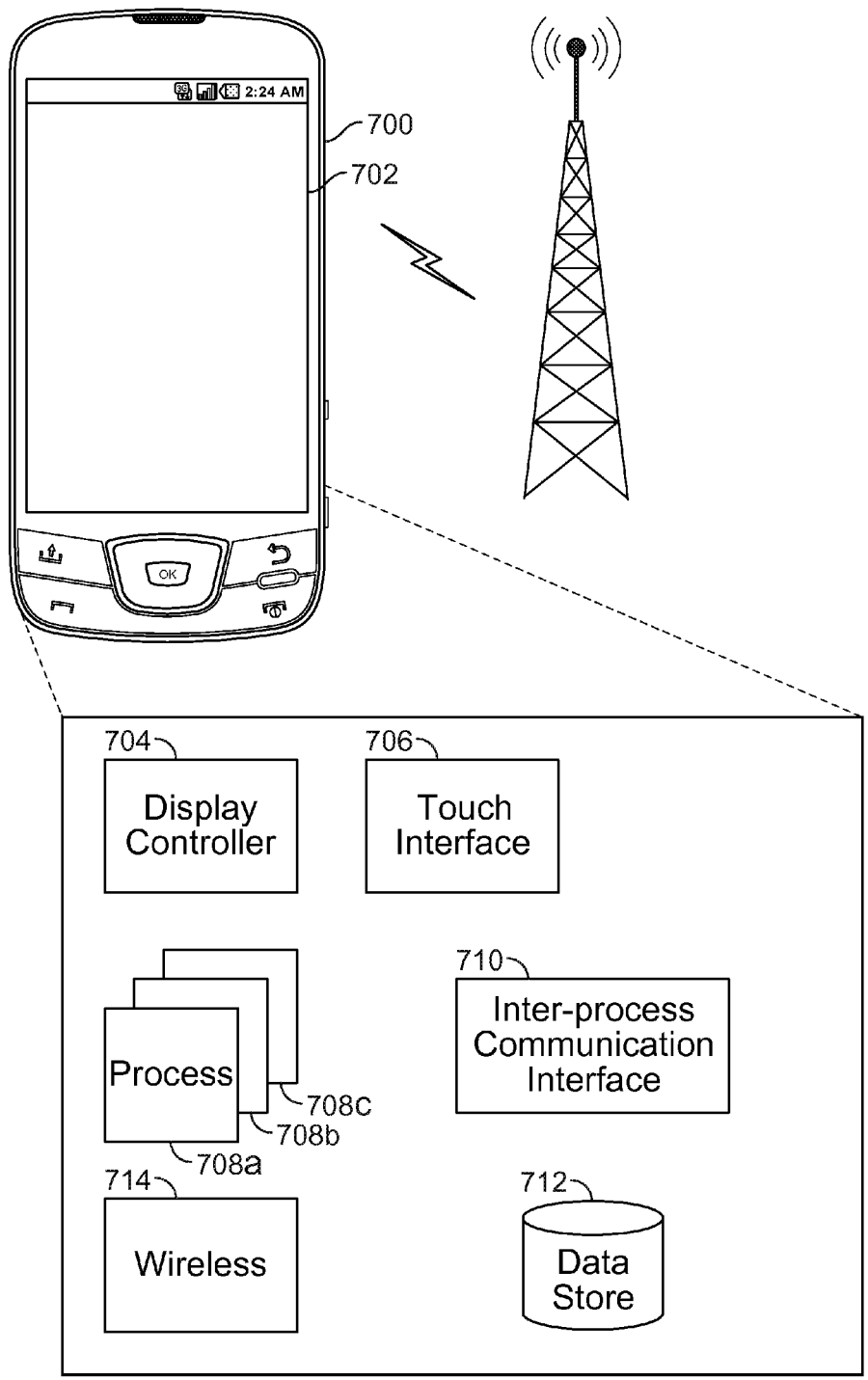
FIG. 7 shows aspects of an example device for displaying content on a home screen, which may be used with the techniques described here.

FIG. 7 shows an example device 700 for displaying content on a home screen. The device is shown here in the form of a smart phone having a touchscreen 702 user interface of a familiar type.

The device 700 includes a number of components to assist in executing software in a manner that is pleasing and useful to a user. Certain example components are shown here. For example, a display controller 704 may be programmed to coordinate the display of various items on the touchscreen 702. For example, the display controller 704 may receive graphical input from a number of different applications and from an operating system, and may determine the manner in which such items should be displayed. For example, the display controller 704 may identify a plurality of visual layers within which object will be displayed, and may crop or otherwise affect the display of objects when objects overlap in the plane of the display.

The display controller 704 may operate in the manner discussed above, for example, to display updates, animations or other actions for a wallpaper layer, in response to user inputs on objects at another layer, such as an icon layer or application display layer, or in response to received information of the type described above with reference to FIGS. 3A, 3B, 4, 5A, 5B and 6.

A touch interface 706 may take a familiar form and may interpret input by a user on a touchscreen. The touch interface 706 may coordinate with the display controller 704 to identify what item or items on a display a user is selecting by touching at a particular location.

A number of processes or environments 708a-c may also be provided for code isolation and execution on the device 700. Each of the processes or environments 708a-c may be associated with a particular application or applications that are executing on the device, or with objects used to provide display aspects for the device. For example, a wallpaper object may execute in one of the environments such as environment 708a, objects associated with icons or gadgets may execute in a second environment such as environment 708b, and application objects may execute in a third environment such as environment 708c. The processes or environments 708a-c may be sandboxed or otherwise separated from each other to prevent hang ups in objects or code sequences executing in one process or environment from affecting objects or code sequences executing in other processes or environments, and to provide additional security as between the processes or environments. In the example here, each layer or object on a home screen may be associated and run in a particular and individual process or environment that is separate from the processes or environments for other objects.

An inter-process communication interface 710 may manage communication between and among the various processes or environments. For example, a component or code segment associated with a process or environment may register an intent with another component or object in the same process or environment or in a different process or environment, so that when particular events occur with the one process or environment, information about the events is communicated to the registering component or object. For example, a wallpaper component or object executing in a first process or environment may want to know whenever a user selects or otherwise manipulates an icon or icons that correspond to an icon component or object executing in a second process or environment on a device. Similarly, the wallpaper component may want to know when information is received by the device, as by a component executing in a separate process or environment, from another computing device, where the information is relevant for updating a visual appearance of the wallpaper. When such an action occurs, the received information, or alternatively information about the manipulations, such as a starting point and ending point, along with information defining a path traveled by the user between the points when manipulating the object, may be provided to the wallpaper process. The wallpaper process may then use the message information according to its own programming. For example, where a user moves an icon, the wallpaper process may use the locations at which interaction with the icon occurred, in order to visually change how the wallpaper is displayed, in a way that coordinates with the manipulation by the user. Where the message information includes information (for example, text, image, streaming video, stock quotes, sports scores, social network posts, social network pictures, received email, traffic information, weather information) that can be visually presented in the wallpaper, the wallpaper process may cause an updated wallpaper with changed appearance to be displayed.

An objects/wallpapers 712 data store may store information about various entities needed to provide the functionality described here. For example, a user may load various interactive, live wallpaper objects and applications onto their device so that they may change between them as they want to have a change of pace. Also, third-parties may develop such wallpaper objects and applications, so that users may obtain additional content and information related to that content may be stored in the data store 712. Other custom operating system theme elements can be obtained and stored in the data store 712, for example. A wireless module 714 allows the device 700 to communicate wirelessly with other electronic computing devices (not shown).

Figure 9:
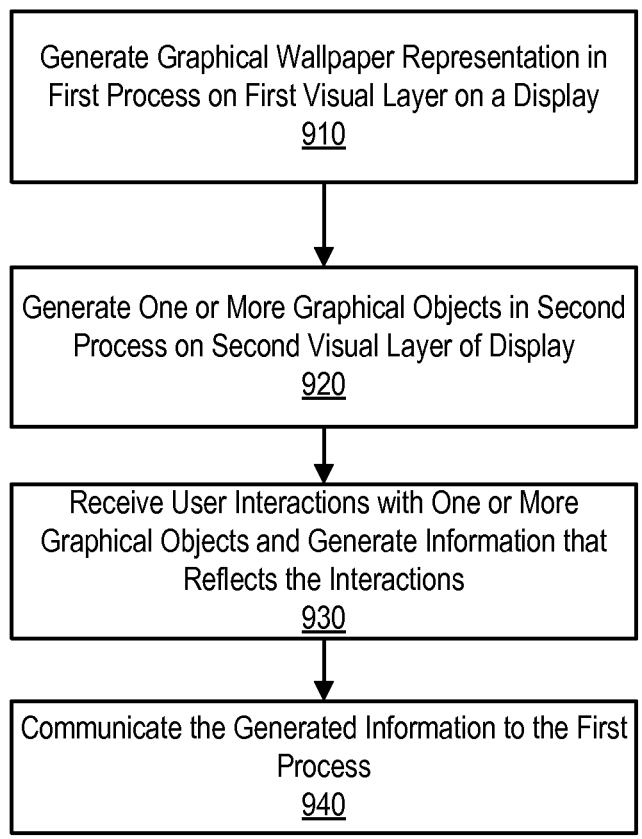
FIG. 9 is a flow chart of an example method for generating a graphical user interface on a display of a computing device.

FIG. 9 is a flow chart of an example method 900 for generating a graphical user interface on a display of a computing device. A graphical wallpaper representation is generated in a first process on a first visual layer on a display of a computing device (910). One or more graphical objects are generated in a second process on a second visual layer of the display (200), where the second visual layer may be positioned visually on top of the first visual layer. User interactions with the one or more of the graphical objects are received, and information that reflects the user interactions is generated (930). The generated information is communicated to the first process (940).

Figure 10:
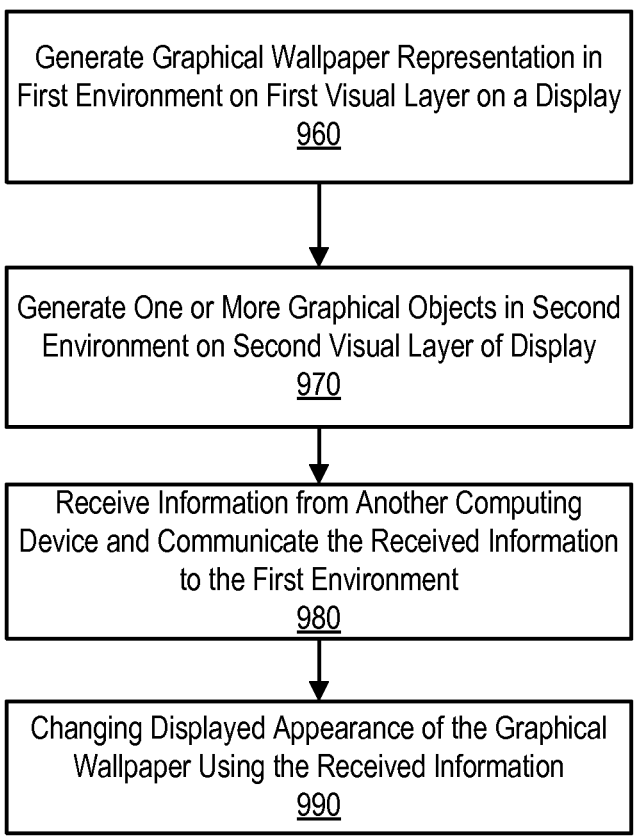
FIG. 10 is a flow chart of an example method 950 for coordinating a display of on-screen elements on a computing device.

FIG. 10 is a flow chart of an example method 950 for coordinating a display of on-screen elements on a computing device. A graphical wallpaper representation is generated in a first environment on a first visual layer on a display of a computing device (960). One or more graphical objects are generated in a second environment on a second visual layer of the display (970), where the second visual layer may be positioned visually on top of the first visual layer. Information is received from another computing device and the received information is communicated to the first environment (980). A displayed appearance of the graphical wallpaper representation is changed using the received information (990).

Figure 8:
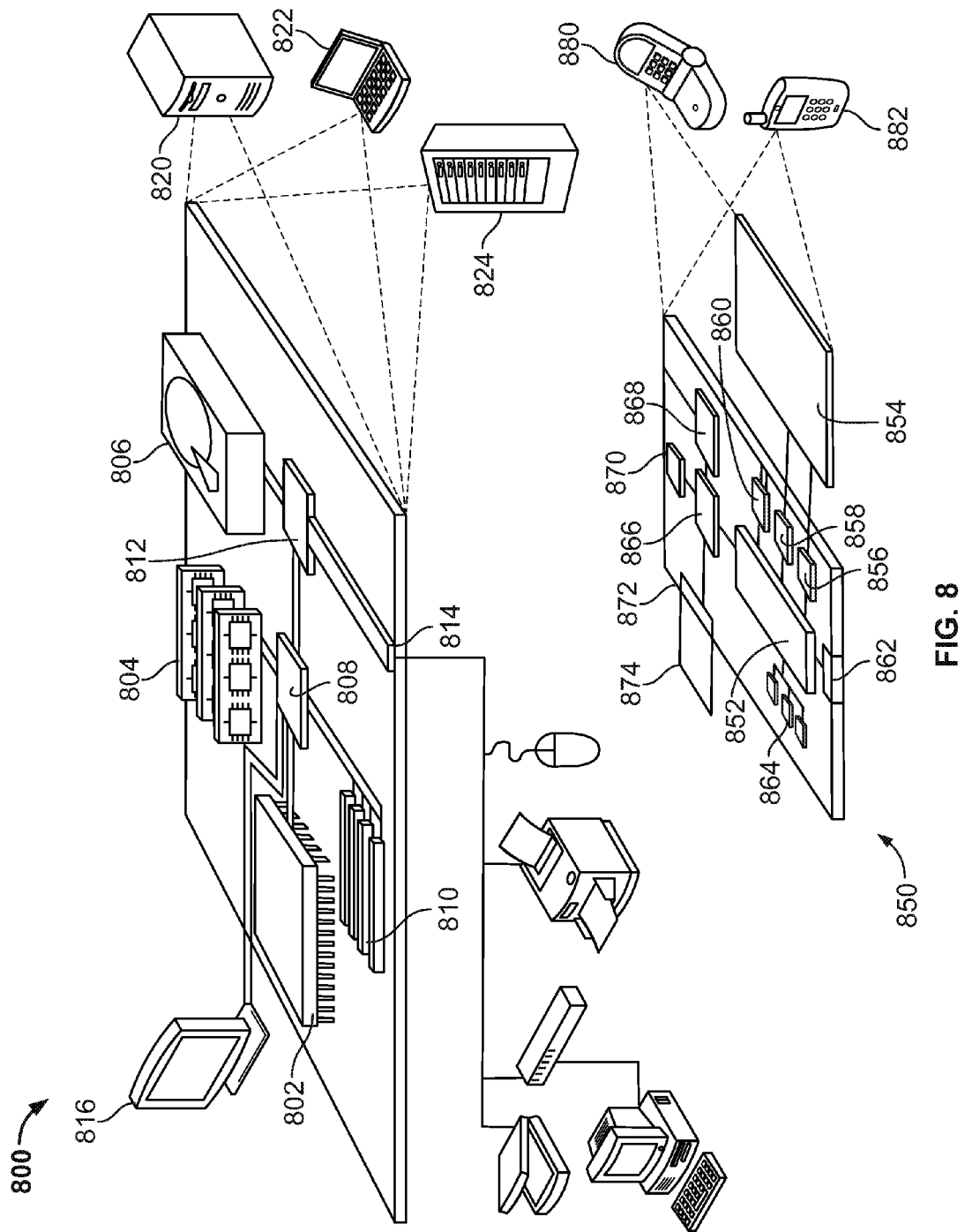
FIG. 8 shows an example of a generic computer device and a generic mobile computer device, which may be used with the techniques described here.

FIG. 8 shows an example of a generic computer device 800 and a generic mobile computer device 850, which may be used with the techniques described here.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, table computers and other similar computing devices. The components shown here, their connections and relationships, and their functions, are meant to be exemplary only, and are not meant to limit implementations of the techniques described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
generating, by a first process executing on a computing device, a graphical wallpaper representation on a first visual layer at a display of the computing device, wherein the first visual layer is a bottom-most visual layer output at the display of the computing device;
generating, by a second process executing on the computing device, a representation of an icon on a second visual layer at the display of the computing device, wherein the second visual layer is positioned visually on top of the first visual layer, wherein the computing device is configured to launch an application program associated with the icon or bring focus to the application program when the icon is selected by user input in a particular manner;
receiving, by the second process, an indication of user input to move the icon in a path across the display of the computing device;
providing, by the second process and to the first process, information that identifies locations of the path between a starting point of the path and an ending point of the path; and
animating, by the first process and in response to receiving the information that identifies the locations of the path, portions of the graphical wallpaper representation along the locations of the path over which the icon was moved in order to coordinate movement of the portions of the graphical wallpaper representation with movement of the icon, wherein receiving, by the second process, the indication of the user input to move the icon includes receiving, by the second process, the information that identifies the locations of the path between the starting point of the path and the ending point of the path before the second process provides the information to the first process.

2. The method of claim 1, wherein generating the graphical wallpaper representation comprises displaying a visual image that covers substantially an entirety of the display of the computing device.

3. The method of claim 1, wherein the animating comprises simulating frictional dragging of an element of the graphical wallpaper representation to coordinate with the movement of the icon that is positioned visually on top of the graphical wallpaper.

4. The method of claim 3, wherein the animating comprises bending one or more graphical elements in a direction of the movement of the icon.

5. The method of claim 3, wherein the animating comprises one or more perturbations in a surface of the graphical wallpaper representation.

6. The method of claim 5, wherein the one or more perturbations comprise motion that radiates out, on the graphical wallpaper representation, from the locations of the path.

7. The method of claim 1, wherein the icon is at least partially transparent so as to permit part of the graphical wallpaper representation to show through on the display within an area defined by an outer perimeter of the icon.

8. The method of claim 1, wherein the animating comprises providing a live image being captured in real-time by a digital camera in the computing device.

9. The method of claim 1, wherein the animating comprises providing an image representing real-time data downloaded from a remote web server over a wireless connection to the computing device.

10. The method of claim 9, wherein the image representing real-time data downloaded from the remote web server comprises information from a social networking site.

11. The method of claim 9, wherein the image representing real-time data downloaded from the remote web server comprises a map.

12. The method of claim 9, wherein the image representing real-time data downloaded from the remote web server comprises weather information.

13. The method of claim 1, further comprising receiving a user selection of the icon and opening a graphical object in a third layer that is visually in front of the second layer and that executes in a third process that differs from the first process and the second process.

14. A computer-implemented method comprising:
generating, by a first process executing on a computing device, a graphical wallpaper representation on a first visual layer at a display of the computing device, wherein the first visual layer is a bottom-most visual layer output at the display of the computing device;
generating, by a second process executing on the computing device, a representation of an icon on a second visual layer at the display of the computing device, wherein the second visual layer is positioned visually on top of the first visual layer, wherein the computing device is configured to launch an application program associated with the icon or bring focus to the application program when the icon is selected by user input in a particular manner;
receiving, by the second process, an indication of user input to move the icon in a path;
providing, by the second process and to the first process, information that identifies locations of the path between a starting point of the path and an ending point of the path; and
animating, by the first process and in response to receiving the information that identifies the locations of the path, portions of the graphical wallpaper representation along the locations of the path over which the icon was moved in order to coordinate movement of the portions of the graphical wallpaper representation with movement of the icon, so as to simulate frictional dragging of elements of the graphical wallpaper representation along the locations of the path as a result of the user input to move the icon, wherein receiving, by the second process, the indication of the user input to move the icon includes receiving, by the second process, the information that identifies the locations of the path between the starting point of the path and the ending point of the path before the second process provides the information to the first process.

15. An article comprising a non-transitory computer-readable data storage medium, having recorded and stored thereon instructions, that when executed, perform actions that comprise:
generating, by a first process executing on a computing device, a graphical wallpaper representation on a first visual layer at a display of the computing device, wherein the first visual layer is a bottom-most visual layer output at the display of the computing device;
generating, by a second process executing on the computing device, a representation of an icon on a second visual layer at the display of the computing device, wherein the second visual layer is positioned visually on top of the first visual layer, wherein the computing device is configured to launch an application program associated with the icon or bring focus to the application program when the icon is selected by user input in a particular manner;
receiving, by the second process, an indication of user input to move the icon in a path across the display of the computing device;
providing, by the second process and to the first process, information that identifies locations of the path between a starting point of the path and an ending point of the path; and
animating, by the first process and in response to receiving the information that identifies the locations of the path, portions of the graphical wallpaper representation along the locations of the path over which the icon was moved in order to coordinate movement of the portions of the graphical wallpaper representation with movement of the icon, wherein receiving, by the second process, the indication of the user input to move the icon includes receiving, by the second process, the information that identifies the locations of the path between the starting point of the path and the ending point of the path before the second process provides the information to the first process.

16. The article of claim 15, wherein generating the graphical wallpaper representation comprises displaying a visual image that covers substantially an entirety of the display of the computing device.

17. The article of claim 15, wherein the animating comprises simulating frictional dragging of an element of the graphical wallpaper representation to coordinate with the movement of the icon that is positioned visually on top of the graphical wallpaper.

18. The article of claim 17, wherein the animating comprises bending one or more graphical elements in a direction of the movement of the icon.

19. The article of claim 17, wherein the animating comprises one or more perturbations in a surface of the graphical wallpaper representation.

20. The article of claim 19, wherein the one or more perturbations comprise motion that radiates out, on the graphical wallpaper representation, from the locations of the path.

21. The article of claim 15, wherein the icon is at least partially transparent so as to permit part of the graphical wallpaper representation to show through on the display within an area defined by an outer perimeter of the icon.

22. The article of claim 15, wherein the animating comprises providing a live image being captured in real-time by a digital camera in the computing device.

23. The article of claim 15, wherein the animating comprises providing an image representing real-time data downloaded from a remote web server over a wireless connection to the computing device.

24. The article of claim 23, wherein the image representing real-time data downloaded from the remote web server comprises information from a social networking site.

25. The article of claim 23, wherein the image representing real-time data downloaded from the remote web server comprises a map.

26. The article of claim 23, wherein the image representing real-time data downloaded from the remote web server comprises weather information.

27. The article of claim 15, wherein the actions further comprise receiving a user selection of the icon and opening a graphical object in a third layer that is visually in front of the second layer and that executes in a third process that differs from the first process and the second process.

28. A computer-implemented system, comprising:
a display device;
a first object for generating, by a first execution process, a graphical representation of a background wallpaper for a home screen of a computing device, the first object including executable content that when executed, animates, in response to the first object receiving information that identifies locations of a path between a starting point of the path and an ending point of the path through which an icon was moved by user input, portions of the graphical wallpaper representation to coordinate movement of the portions of the graphical wallpaper representation with the movement of the icon along the path, the icon being positioned visually on top of the background wallpaper;
one or more user selectable second objects, wherein the icon is one of the one or more user selectable second objects; and
a display controller programmed to:
generate, by the first execution process, on a first visual layer at the display device, a graphical display of the first object, wherein the first visual layer is a bottom-most visual layer output at the display device,
generate, by a second execution process that is distinct from the first execution process, on a second visual layer at the display device, a graphical display of the icon, wherein the second visual layer is positioned visually in front of the first visual layer at the display device, and
provide, by the second execution process and to the first execution process, the information that identifies locations of the path between the starting point of the path and the ending point of the path, wherein the second execution process receives the information that identifies the locations of the path between the starting point of the path and the ending point of the path before the second execution process provides the information to the first execution process.

29. A computer-implemented method comprising:
generating, in a first environment on a computing device, a graphical wallpaper representation on a first visual layer at a display of the computing device, wherein the first visual layer is a bottom-most visual layer output at the display of the computing device;
generating, in a second environment on the computing device, a representation of an icon on a second visual layer at the display of the computing device, wherein the second visual layer is positioned visually on top of the first visual layer;
receiving, by the second environment, an indication of user input to move the icon in a path across the display of the computing device;
providing, by the second environment and to the first environment, information that identifies locations of the path between a starting point of the path and an ending point of the path; and
animating, by the first environment and in response to receiving the information that identifies the locations of the path, portions of the graphical wallpaper representation along the locations of the path over which the icon was moved in order to coordinate movement of the portions of the graphical wallpaper representation with movement of the icon, wherein receiving, by the second environment, the indication of the user input to move the icon includes receiving, by the second environment, the information that identifies the locations of the path between the starting point of the path and the ending point of the path before the second environment provides the information to the first environment.

30. The method of claim 29, wherein a virtual machine isolates a code segment associated with an object of the wallpaper in the first environment and code segments associated with the icon in the second environment.

31. The method of claim 29, wherein a code segment executing in the first environment is sandboxed from code segments executing in the second environment.

32. The method of claim 29, wherein the animating comprises providing an image representing real-time data downloaded from a remote web server over a wireless connection to the computing device, wherein the image representing real-time data downloaded from the remote web server comprises information associated with a social networking site.

33. The method of claim 29, wherein the animating comprises providing an image representing real-time data downloaded from a remote web server over a wireless connection to the computing device, wherein the image representing real-time data downloaded from the remote web server comprises traffic information.

\* \* \* \* \*